United States Patent [19]

Crompton et al.

[11] Patent Number: 5,008,036
[45] Date of Patent: * Apr. 16, 1991

[54] COLLOIDAL SOLS OF ANTIMONY PENTOXIDE IN AN AQUEOUS MEDIUM AND THEIR PREPARATION

[75] Inventors: Charles E. Crompton, Arlington Heights, Ill.; Abdulla M. Z. Kazi, Euclid; Inderjit S. Soni, Bedford Heights, both of Ohio

[73] Assignee: Laurel Industries, Inc., Cleveland, Ohio

[*] Notice: The portion of the term of this patent subsequent to Sep. 7, 2009 has been disclaimed.

[21] Appl. No.: 605,607

[22] Filed: Aug. 18, 1975

[51] Int. Cl.$^5$ .............. B01J 13/00; C01G 30/00; C09K 21/02
[52] U.S. Cl. .............. 252/313.1; 106/18.28; 106/455; 252/363.5; 252/609; 252/610; 423/272; 423/617
[58] Field of Search .............. 423/617, 272; 252/313 R, 609, 610, 313.1; 106/18.28, 455

[56] References Cited

U.S. PATENT DOCUMENTS

| | | | |
|---|---|---|---|
| 1,995,063 | 3/1935 | Harris et al. | 423/272 |
| 3,037,847 | 6/1962 | Warshaw | 423/272 |
| 3,194,768 | 7/1965 | Lindner et al. | 423/272 |
| 3,388,069 | 6/1968 | Lindner | 423/272 |
| 3,657,179 | 4/1972 | Yates | 524/173 |
| 3,676,362 | 7/1972 | Yates | 252/309 |
| 3,676,477 | 7/1972 | Chay et al. | 556/76 |
| 3,766,065 | 10/1973 | Chay et al. | 252/610 |
| 3,836,557 | 9/1974 | Knowles | 556/36 |
| 3,847,830 | 11/1974 | Williams et al. | 423/272 |
| 3,860,523 | 1/1975 | Petrow et al. | 252/609 X |
| 3,960,989 | 6/1976 | Petrow et al. | 252/610 X |
| 3,984,353 | 10/1976 | Sergunkin et al. | 423/617 |
| 3,994,825 | 11/1976 | Crompton et al. | 252/314 X |
| 4,022,710 | 5/1977 | Kobashi et al. | 252/313.1 |
| 4,028,266 | 6/1977 | Langere et al. | 252/313.1 |
| 4,051,064 | 9/1977 | Crompton et al. | 252/8.1 X |
| 4,438,301 | 9/1982 | Crompton et al. | 423/617 X |

FOREIGN PATENT DOCUMENTS

| | | | |
|---|---|---|---|
| 45-40166 | of 1970 | Japan | 423/617 |
| 0289055 | 12/1970 | U.S.S.R. | 423/617 |

*Primary Examiner*—Richard D. Lovering
*Attorney, Agent, or Firm*—Jones, Day, Reavis & Pogue

[57] ABSTRACT

A colloidal dispersion of hydrous antimony pentoxide particles is made by a process which comprises introducing a particulate antimony component selected from the group consisting of antimony metal and antimony trioxide into an essentially aqueous medium and contacting said antimony component with hydrogen peroxide at a temperature of from about 0° C. to about the decomposition temperature of the reaction mixture for a length of time sufficient to convert at least a portion of the antimony component to colloidal particles of hydrous antimony pentoxide.

35 Claims, No Drawings

COLLOIDAL SOLS OF ANTIMONY PENTOXIDE IN AN AQUEOUS MEDIUM AND THEIR PREPARATION

BACKGROUND OF THE INVENTION

The role of antimony compositions in the flameproofing of various polymers has been known for many years. One problem associated with many of the prior art antimony compositions used in flameproofing systems is the delustering of fibrous polymers. This problem may be overcome by providing an antimony composition of sufficiently small particle size, significantly less than one micron, so that the antimony particles do not scatter light and thus do not deluster the treated polymer.

Another difficulty associated with the use of an antimony composition in flameproofing polymers lies in the incorporation of the antimony compositions in the polymer. It is desirable to mix the antimony composition with a solution of the polymer in a polar organic spinning or casting solvent prior to final product fabrication. Many prior art compositions of antimony are neither soluble nor readily dispersible in the polar organic solvents commonly used in polymer formulations.

Several methods for preparing colloidal dispersions of antimony pentoxide for use as flameproofing agents for plastics, fibers, elastomers and other polymeric compositions are known in the art. For example, U.S. Pat. No. 3,860,523 teaches a method for forming colloidal antimony pentoxide by deionizing potassium antimonate with a cation exchange resin. Another method for forming sols of antimony pentoxide is shown by U.S. Pat. No. 3,657,179 which teaches the use of antimony trichloride and nitric acid to form a dispersion in a polar organic solvent, and stabilization of the dispersion with an alpha-hydroxy carboxylic acid. The dispersions taught by the 3,657,179 patent contain from 0.01% to 5% water by weight.

The formation of pentavalent antimony compositions by the oxidation of trivalent antimony compositions with hydrogen peroxide is also known in the art. U.S. Pat. No. 3,836,557 shows a method for preparing water soluble salts of pentavalent antimony glycol esters by reacting antimony trioxide with hydrogen peroxide in ethylene glycol under vacuum to remove the water of reaction. U.S. Pat. No. 3,676,477 teaches the formation of pentavalent antimony esters by reacting antimony trioxide with hydrogen peroxide in a polyhydroxy alcohol with distillation to remove the water of reaction.

Many of the foregoing methods require expensive procedures for formulating compositions which can be employed effectively in relatively few polymer systems. The products of many of the foregoing methods are also bulky, difficult to handle, and expensive to transport.

It is, therefore, an object of this invention to provide a colloidal dispersion of hydrous antimony pentoxide particles which can be dried to a readily redispersible powder capable of forming a stable colloidal dispersion in an aqueous medium, and a process for making said dispersion.

Another object of this invention is to provide a stable, essentially aqueous dispersion of hydrous antimony pentoxide which needs no artificial stabilization, and a process for making said dispersion.

Yet another object of this invention is to provide hydrous antimony pentoxide sols which can be employed as flame retardant agents in natural and synthetic fibers and other polymeric materials, and a process for making said sols.

A further object of this invention is to provide an economical process for making hydrous antimony pentoxide sols from commercial grades of antimony trioxide.

Other objects of this invention will become readily apparent from the following description of the invention.

SUMMARY OF THE INVENTION

The objects of this invention may be accomplished by a process which comprises introducing a particulate antimony component selected from the group consisting of antimony metal and antimony trioxide into an essentially aqueous medium and contacting said antimony component with hydrogen peroxide at a temperature of from about 0° C. to about the decomposition temperature of the reaction mixture for a length of time sufficient to convert at least a portion of the antimony component to colloidal particles of hydrous antimony pentoxide. The contacting of the antimony component with hydrogen peroxide may be done in the presence or absence of a stabilizer selected from the group consisting of alkanolamines, alkanolamine salts, alpha-hydroxy carboxylic acids and polyhydroxy alcohols. The stabilizer may be added after a portion of the antimony component has been converted to colloidal particles of hydrous antimony pentoxide.

DESCRIPTION OF THE PREFERRED EMBODIMENT

The antimony component which may be utilized in the practice of this invention may be either elemental antimony, preferably antimony metal which has been powdered to a size of 100 mesh or higher, or antimony trioxide, preferably of the senarmontite structure. A commercially available grade of antimony trioxide, which is sold by Chemetron Corporation under the trademark Fire-Shield High-Tint antimony trioxide, is preferable in the practice of this invention because of its lower cost even though it is much less reactive than freshly precipitated antimony oxide or hydrated antimony oxide.

The colloidal sols are formed in an essentially aqueous medium. To avoid contamination of the sols of this invention, it is desirable to use deionized water as the dispersion medium, but the practice of this invention may be accomplished with ordinary tap water. If it is important to avoid contamination of the polymeric composition in which the colloidal sol of this invention is employed as a flameproofing agent it is preferable to use the deionized water. The dispersion medium may also contain a stabilizer of the kind and in the amounts discussed below.

The particles of hydrous antimony pentoxide in the dispersion of this invention may exist in many different hydrated forms, the exact nature of which is not fully known. One possible hydrated form is $Sb_4O_6(OH)_8$. Such a structure would have a tetrahedral configuration with a pentavalent antimony atom located at each apex of the tetrahedron. Two hydroxyl groups are attached to each antimony atom which, in turn, are bonded to each of the remaining three antimony atoms by Sb—O—Sb linkages. Another possible form of the hydrated antimony pentoxide is $Sb(OH)_5$ in which five hydroxyl groups are bonded to any given pentavalent antimony atom. It is contemplated that many solvated forms of antimony pentoxide may exist in the colloidal dispersions of this invention, all of which are included in the term hydrous antimony pentoxide. The concentration of antimony pentoxide in the dispersion is not critical, but usually it will be present at a concentration of from about 0.01% to about 40% (expressed as antimony metal) of the total weight of the dispersion and preferably from about 10% to about 40% of the total weight of the dispersion.

In one embodiment of this invention, particles of antimony metal are stirred in deionized water and contacted with hydrogen peroxide. Five moles of hydrogen peroxide react with two moles of elemental antimony to yield hydrated antimony pentoxide and water. This is usually accomplished by adding aqueous hydrogen peroxide to the stirred suspension of non-colloidal antimony particles but the hydrogen peroxide may be present in the dispersion medium initially and the antimony added thereto with stirring. In either procedure, the reaction mixture is preferably heated to reflux temperature and maintained at said temperature until completion of the reaction, which is indicated by a marked reduction in the refluxing rate of the water. Any non-reacted antimony may be removed by filtration, centrifugation or the like. The product is a sol consisting essentially of colloidal particles of hydrous antimony pentoxide in an aqueous medium. Said sol is characterized by the small particle size of the antimony pentoxide which ;nay be from about 150 Å to about 250 Å, and the fact that the dispersion medium, which is water, needs no stabilizers. This sol has been found to be stable for long periods of time.

In another embodiment of this invention antimony trioxide is suspended in water, preferably deionized water, and the antimony particles are contacted with hydrogen peroxide. Two moles of hydrogen peroxide react with one mole of antimony trioxide to yield hydrated antimony pentoxide and water.

The antimony may be contacted with the hydrogen peroxide by several methods. One procedure consists of adding the hydrogen peroxide as an aqueous solution to a suspension of non-colloidal antimony trioxide particles. The addition may be performed in one step or in a series of incremental additions of the hydrogen peroxide solution. The reaction between the antimony trioxide and the hydrogen peroxide may occur at any temperature from about 0° C. to the decomposition temperature of the reactants, but the reflux temperature of the system is preferred. If it is desired to perform the reaction at a low temperature such as room temperature, it is preferable that the initial suspension of non-colloidal antimony trioxide in aqueous hydrogen peroxide have a weight concentration of antimony (calculated as metal) of approximately 40%. As the reaction proceeds, the mixture may be diluted with water to achieve a final colloidal dispersion containing approximately 10% antimony (calculated as metal).

In yet another embodiment of this invention, a colloidal dispersion of hydrous antimony pentoxide particles is formed by suspending an antimony component selected from the group consisting of antimony metal and antimony trioxide in water and contacting the antimony component with hydrogen peroxide in the presence of a water soluble stabilizer selected from the group consisting of alkanolamines, alkanolamine salts, alpha-hydroxy carboxylic acids and polyhydroxy alcohols. The stabilizer is usually employed in a molar ratio of stabilizer to antimony of from about 0.01:1 to about 4:1, and preferably in a molar ratio of from about 0.05:1 to about 2:1. The presence of even a minor amount of stabilizer causes the particle size of the product sol to be less than the particle size of a similar sol which is prepared without the use of a stabilizer. Increasing amounts of stabilizer cause corresponding decreasing particle sizes in the product sols until the amount of stabilizer is at a concentration equal to about a 4:1 molar ratio of stabilizer to antimony. Levels of stabilizers above this concentration apparently effectuate no further particle size reduction in the product sol.

The alkanolamines which are operable in the practice of this invention are water soluble alkanolamines. The alkanolamines which are especially useful in the practice of this invention are water-soluble compounds selected from the group consisting of

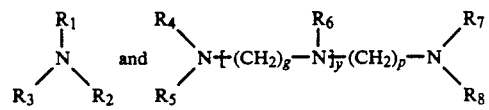

wherein $R_1$, $R_2$, $R_3$, $R_4$, $R_5$, $R_6$, and $R_7$ and $R_8$ are the same or different from one another; $R_1$ and $R_2$ are selected from the group consisting of hydrogen and alkylene hydroxy radicals of the type $-\!\!\!+\!(CH_2)_n\!-\!O-\!\!\!\!\!+_x(CH_2)_n-\!OH$; $R_3$, $R_4$, $R_5$, $R_6$, $R_7$, and $R_8$ are selected from the group consisting of alkylene hydroxy radicals of the type $-(CH_2)_n-OH$ and alkylene hydroxy radicals of the type $-\!\!\!+\!(CH_2)_n-\!O-\!\!\!\!\!+_x(CH_2)_m-OH$, wherein m and n are integers from 1 to 6, p and g are integers from 1 to 10, x is an integer from 1 to 2 and y is an integer from 0 to 7. Examples of such alkanolamines include diethanolamine and triethanolamine.

Water-soluble alkanolamine salts are operable in the practice of this invention also. The salts of alkanolamines that are especially useful in the practice of this invention include those formed by any of the foregoing alkanolamines with an acid selected from the group consisting of boric acid, phosphoric acid, and benzoic acid. The phosphoric acid salts are preferred. Diethanolamine phosphate and triethanolamine phosphate are particularly preferred. Triethanolamine phosphate is most preferred, at a molar ratio of triethanolamine phosphate to antimony from about 0.05:1 to about 0.1:1.

Any water soluble aliphatic alpha-hydroxy carboxylic acid is operable in the practice of this invention. Aliphatic alpha-hydroxy carboxylic acids include tartaric acid, citric acid, malic acid, hydroxyacetic acid, mucic acid, lactic acid, glyceric acid, gluconic acid and the like.

The polyhydroxy alcohols that are operable in the practice of this invention are water-soluble aliphatic alcohols having vicinal hydroxy groups. The polyhydroxy alcohols that are especially useful in the practice of this invention are aliphatic alcohols having from two to six carbon atoms and having vicinal hydroxyl groups. Particularly useful polyhydroxy alcohols are glycerol, ethylene glycol, 1,2-propanediol, 1,2-butanediol, 2,3-butanediol, and trimethylol propane.

The stabilizer has at least a three-fold function in the method of this invention. The stabilizer apparently acts to lower the activation energy for the oxidation of antimony metal or trivalent antimony to pentavalent antimony; the rate of reaction for the oxidation to pentavalent antimony is greatly increased when a stabilizer is present, thus causing rapid colloid formation even at room temperature; and causes a smaller average particle size. It has been determined that the order of addition of the four components of the colloidal dispersions of this invention has no effect upon the dispersion produced. Thus, the antimony component, hydrogen peroxide solution, stabilizer, and water may be combined in any sequence within a short period of time, such as one minute, and still produce equivalent dispersions of hydrous antimony pentoxide particles in an essentially aqueous medium.

The concentration of the aqueous solution of hydrogen peroxide which may be employed in the practice of this invention is not critical. Any concentration of hydrogen peroxide may be employed, including pure hydrogen peroxide. The hydrogen peroxide which is preferable in the practice of this invention, because of its stability and lower cost, is a commercially available aqueous solution containing 35% hydrogen peroxide, by weight. Any concentration cf hydrogen peroxide in the reaction media will be operable in the practice of this invention.

The antimony particles may first be contacted with the hydrogen peroxide in the absence of a stabilizer to convert at least a portion of the antimony component to colloidal particles of hydrous antimony pentoxide before a stabilizer is added to the dispersion medium. This method yields a smaller colloidal particle size than the method employing no stabilizer, but the particle size is greater than when the oxidation occurs entirely in the presence of a stabilizer.

The colloidal sols of this invention may be dried to a fine powder by a suitable method, e.g., spray-drying. This powder may be redispersed to reform highly stable colloidal dispersions in essentially aqueous media. A typical procedure for accomplishing such a redispersion comprises agitating the aqueous medium at a high shear rate and adding to said agitated medium in ten equal portions, sufficient dry colloid to obtain a sol having a weight ratio of colloid to water of approximately 1:4. An interval of approximately two minutes may be allowed between additions and the mixture may be stirred for approximately, one hour after the final addition is complete to obtain a clear dispersion. If the final dispersion contains any discrete large particles, filtration may be employed to remove said particles. The weight ratio of colloid to water may be increased or decreased to fulfill the particular, end use acquirements for the sol. A weight ratio of colloid to water of from about 0.01:1 to about 1:1 is obtainable, and a generally desirable ratio is about 1:4. A typical colloidal dispersion formed by contacting antimony trioxide with hydrogen peroxide in the presence of triethanolamine phosphate has an average particle size of about 40 Å or less. When such a colloidal dispersion is spray dried and redispersed according to the procedure above, to obtain a weight ratio of colloid to water of about 1:4, the resulting colloidal sol typically has a particle size of approximately 60 Å.

The use of antimony oxides to aid the flame resistance of various polymeric compositions is well known. It is preferable to use sub-micron sized particles of antimony oxide so that fibers which are treated with the antimony oxide are not delustered or plastics opacified. The colloidal dispersions of this invention are well suited for use in synthetic fibers and plastics because the average particle size of the sol is from less than 40 Å to approximately 300 Å and the sols are compatible with many organic solvents which are used for the spinning and film casting of many polymers. Examples of such solvents are methanol, ethylene glycol, acetic acid, dimethyl formamide, dimethyl acetamide, formamide, trimethylolpropane and the like. Examples of polymers which may be treated with the products of this invention include polyacrylonitrile, copolymers of acrylonitrile with vinyl and vinylidene halides, polyamides, polyesters, polyurethanes, polyacrylates, polyvinyl chloride, acrylonitrile-butadiene-styrene polymers, and the like. The amount of product of this invention to be used in a polymer system will vary with the particular characteristics of a given polymer and the degree of flameproofing desired.

The following examples further illustrate this invention. All percentages are by weight, based on elemental antimony unless otherwise indicated. In all cases, the water employed in the examples in deionized water, the antimony trioxide is Fire-Shield High-Tint antimony trioxide from Chemetron Corporation and the hydrogen peroxide solution is a commercially available aqueous solution containing 35% hydrogen peroxide by weight. The colloidal dispersions made in the following examples may be filtered to remove undesired suspended particles.

EXAMPLE I 48.6 grams (0.5 mole) of hydrogen peroxide solution is added to 178.2 grams of water, followed by 48.7 grams (0.4 mole) of powdered antimony metal. The reaction mixture is stirred and heated at the rate of 2°–3° C. per minute until refluxing commences (100°–101° C.). Water refluxes at a rate of 3.5–4.0 milliliters per minute and a blue opalescence appears. After approximately twenty-two minutes of refluxing, the reaction is complete, as indicated by a reduction in the refluxing rate of the water to approximately 1.6 to 2.0 milliliters per minute. The reaction mixture is cooled and filtered to remove the antimony powder residue (24.2 grams). The product is a milky colloidal dispersion of hydrous antimony pentoxide particles having an average particle size of approximately 150–200 Å.

EXAMPLE II 291.5 grams (1.0 mole) of antimony trioxide and 226 grams (2.33 moles) of hydrogen peroxide solution are mixed with stirring. The reaction mixture is diluted with a total of 1940 grams of water over a sixty hour period and the reaction mixture is allowed to stir for an additional 84 hours. The temperature varies from 26°–36° C. over the entire reaction time of 144 hours. The product is an aqueous colloidal dispersion of hydrous antimony pentoxide particles which have an average particle size of 150 Å, containing approximately 10% antimony.

EXAMPLE III 220.5 grams (0.76 moles) of antimony trioxide, 153 grams (1.58 moles) of hydrogen peroxide solution and 1455 grams of water are stirred while heating at a rate of about 2° C. per minute until refluxing commences. Refluxing is allowed to continue for 21.5 minutes, after which time the heating is terminated and the reaction mixture allowed to cool. The product is an aqueous colloidal dispersion of hydrous antimony pentoxide particles which have a particle size of from 170 Å to 250 Å with an average size of approximately 200 Å. The dispersion contains approximately 10% antimony.

EXAMPLE IV 240 grams (2.47 moles) of hydrogen peroxide solution is added to 900 grams of water, followed by the addition of grams (1.23 moles) of antimony trioxide. Heating is commenced with stirring at the rate of 2° C. per minute until refluxing occurs (102° C.). Refluxing is continued for 10 minutes after the heat of reaction has subsided. The reaction mixture is then cooled to 45° C. The product is a yellowish sol having a blue opalescence and an antimony concentration of 20% and an average particle size of 300 Å.

EXAMPLE V 73.6 grams (0.76 mole) of hydrogen peroxide solution is added to 739 grams of water, followed by the addition of 1 110.5 grams (0.38 mole) of antimony trioxide. Heating is commenced with stirring at the rate of 2° C. per minute until the reflux temperature is reached. After refluxing approximately 15 minutes, the heating is terminated and a 100 milliliter sample is removed (sample A).

110.5 grams of antimony trioxide (0.38 moles ) is added to the balance of the dispersion while stirring at 90° C., followed by the addition of 73.6 grams of hydrogen peroxide solution (0.76 moles). The reaction mixture is heated to reflux by the heat of reaction. After refluxing for approximately 20 minutes a 100 milliliter sample is removed (sample B).

110.5 grams of antimony trioxide (0.38 moles ) is added to the balance of the dispersion while stirring at 86° C., followed by the addition of 73.6 grams of hydrogen peroxide solution (0.76 moles). The system is heated to reflux by the heat of reaction. After refluxing for 20 minutes a 100 milliliter sample is removed (sample C).

110.5 grams of antimony trioxide (0.38 moles) is added to the balance of the dispersion while stirring at 90° C. A heat of reaction is immediately observed. 73.6 grams of hydrogen peroxide solution (0.76 moles) is then added to the dispersion and the temperature rises to reflux. After refluxing for 20 minutes a 100 milliliter sample is removed (sample D).

110.5 grams of antimony trioxide (0.38 moles) is added to the balance of the dispersion while stirring at 90° C. A heat of reaction is immediately observed. 73.6 grams of hydrogen peroxide solution (0.76 moles) is added to the dispersion and the temperature rises to reflux. After refluxing for 20 minutes, a 100 milliliter sample is removed from the dispersion (sample E).

110.5 grams of antimony trioxide (0.38 moles ) is added to the balance of the dispersion while stirring at 90° C. A heat of reaction is immediately observed. 73.6 grams of hydrogen peroxide solution (0.76 moles) is added to the dispersion and the temperature rises to reflux. After reflux. After refluxing for 20 minutes a 100 milliliter sample is removed (sample F).

110.5 grams of antimony trioxide (0.38 moles) is added to the balance of the dispersion while stirring at 80° C. 73.6 grams of hydrogen peroxide solution (0.76 moles) is then added to the dispersion and the temperature rises to reflux due to the heat of reaction. After refluxing for 20 minutes, a 100 milliliter sample is removed from the dispersion (sample: G).

110.5 grams of antimony trioxide (0.38 moles) is added to the balance of the dispersion while stirring. A heat of reaction is immediately observed. 73.6 grams of hydrogen peroxide solution, (0.76 moles) is added to the dispersion and the temperature rises to reflux. After refluxing for 20 minutes a 100 milliliter sample is removed (sample H).

Table I lists the specific gravity and the percentage concentration of antimony for each of the eight samples of this example. The table shows that through successive incremental increases, it is possible to produce a high-concentration colloidal dispersion of hydrous antimony pentoxide particles in an aqueous medium without the use of stabilizers. The final sol, sample H, was found to have an average particle size of 700-1200 Å. The sols relatively large particle size is believed to have been the result of the combined effect of successive exposures of the sol to high temperatures during the process of its manufacture and the sol's high concentration of antimony.

TABLE I

| Sample No. | Density (g/ml) | % Sb |
|---|---|---|
| A | 1.13 | 10.48 |
| B | 1.25 | 18.00 |
| C | 1.37 | 24.00 |
| D | 1.48 | 28.73 |
| E | 1.59 | 33.04 |
| F | 1.69 | 35.85 |
| G | 1.77 | 35.55 |
| H | 1.87 | 41.33 |

EXAMPLE VI 110.5 grams (0.38 moles) of antimony trioxide, 73.65 grams (0.76 mole) of hydrogen peroxide solution and 388.5 grams of water are mixed with stirring and heated to reflux temperature (101° C). After five minutes of refluxing, 227.45 grams (1.52 moles) of tartaric acid in 172.55 grams of water is added to the reaction mixture over a five minute period. The product is a colloidal dispersion of hydrous antimony pentoxide particles, stabilized with an alpha-hydroxy carboxylic acid, containing approximately 9% antimony and having a molar ratio of alpha-hydroxy carboxylic acid to antimony of approximately 2:1.

EXAMPLE VII

A mixture of 110.5 grams (0.38 mole) of antimony trioxide, 388.85 grams of water, and 73.65 grams (0.76 mole) of hydrogen peroxide is thoroughly stirred and a solution of 227.45 grams (1.52 moles) of tartaric acid in 172.55 grams of water is added. The temperature of the reaction mixture increases from 29° C. to 83° C. within 18 minutes after the tartaric acid addition. The product is a colloidal dispersion of hydrous antimony pentoxide particles stabilized with an alpha-hydroxy acid. The sol contains approximately antimony and has a molar ratio of alpha-hydroxy carboxylic acid to antimony of approximately 2:1.

EXAMPLE VIII 458.0 grams of water and 1450.0 grams of a 50% solution of gluconic acid in water (3.7 moles of gluconic acid) are mixed and heated to 70° C. 147.0 grams (0.5 mole) of antimony trioxide is added to the reaction mixture and stirred for 10 minutes, after which time 145.0 grams (1.50 moles) of hydrogen peroxide solution is added over a period of one hour and the mixture is stirred for an additional hour. The temperature of the reaction mixture varies from 70°-80° C. over the two hour period. The product is a colloidal dispersion of hydrous antimony pentoxide in an essentially aqueous medium, stabilized with gluconic acid. The dispersion contains 0.20% trivalent antimony and 11.44% antimony, total, with a molar ratio of alphahydroxy carboxylic acid to antimony of approximately 3.7:1.

EXAMPLE IX 221 grams (0.76 mole) of antimony trioxide, 147 grams (1.15 moles) of hydrogen peroxide solution and 1401 grams of water are charged to a reaction flask and heated with stirring to reflux. After the heat of reaction subsides, 77 grams (0.52 mole) of triethanolamine is added to the reaction mixture. The product is a colloidal dispersion of hydrous antimony pentoxide containing 10% antimony and have a particle size of approximately 40–60 Å stabilized with approximately 0.3 moles of the alkanolamine per mole of antimony.

EXAMPLE X 221 grams (0.76 mole) of antimony trioxide, 147 grams (1.51 moles) of hydrogen peroxide solution and 1401 grams of water are heated to reflux, while stirring. After the heat of reaction subsides, 53.9 grams (0.51 moles) of diethanolamine is added to the reaction flask. A colloidal dispersion of hydrous antimony pentoxide particles in an essentially aqueous medium, stabilized with an alkanolamine, is formed. The dispersion contains approximately 10% antimony, has a particle size of 40–60 Å, and is stabilized with approximately 0.3 moles of the alkanolamine per mole of antimony.

EXAMPLE XI 77 grams of triethanolamine (0.52 mole) is added to 200 grams of water with stirring, followed by the addition of 20 grams of an 85% solution of phosphoric acid (0.17 mole phosphoric acid), to form a solution of triethanolamine phosphate. 221 grams (0.76 mole) of antimony trioxide, 1201 grams of water, and 147 grams (1.51 moles) of hydrogen peroxide are heated at reflux for approximately 22 minutes. The triethanolamine phosphate solution from above is then charged to the reaction mixture. The product is a colloidal dispersion of hydrous antimony pentoxide particles in an essentially aqueous medium. The dispersion contains approximately 9% antimony, has an average particle size of less than 40 Å, and is stabilized with approximately 0.3 moles of the alkanolamine salt per mole of antimony.

EXAMPLE XII 148 grams (1.52 moles) of hydrogen peroxide solution is added to 1478 grams of water, with stirring, followed by the addition of 221 grams (0.76 mole) of antimony trioxide. The reaction mixture is heated to reflux at the rate of 2° C. per minute and refluxing is continued for five minutes after the heat of reaction subsides, as indicated by a reduction in the refluxing rate of the water. The reaction mixture is then cooled rapidly at the rate of 8°-12° C. per minute. The product is a colloidal dispersion of hydrous antimony pentoxide particles in an essentially aqueous medium.

EXAMPLE XIII 23.95 grams (0.08 mole) of antimony trioxide, 44.15 grams of water and 15.15 grams (0.16 mole) of glycerol are mixed with rapid stirring to form a slurry a heated to reflux, 100°-110° C. 19.25 grams (0.20 mole) of hydrogen peroxide solution is then added to the stirring mixture over a period of one hour at a temperature of 105°-110° C. The reaction mixture is heated for an additional one-half hour at 110° C. The product is an aqueous colloidal dispersion of hydrous antimony pentoxide stabilized with one mole of polyhydroxy alcohol per mole of antimony.

While the invention has been described with reference to certain specific embodiments, it will be recognized by those skilled in the art that many variations are possible without departing from the spirit and scope of the invention.

What we claim is:

1. A process for making a colloidal dispersion of hydrous antimony pentoxide particles comprising introducing a particulate antimony component selected from the group consisting of antimony metal and antimony trioxide into an essentially aqueous medium which contains no stabilizers and contacting said antimony component with hydrogen peroxide in the aqueous medium, at a temperature of from about 0° C. to about the decomposition temperature of the reaction mixture for a length of time sufficient to convert at least a portion of the antimony component to colloidal particles of hydrous antimony pentoxide.

2. The process of claim 1 further comprising the step of introducing a water-soluble stabilizer selected from the group consisting of alkanolamines, alkanolamine salts, aliphatic alpha-hydroxy carboxylic acids, and aliphatic poly-hydroxy alcohols having vicinal hydroxyl groups into the aqueous medium after at least a portion of the antimony component has been converted to colloidal particles of hydrous antimony pentoxide.

3. The process of claim 2 wherein the stabilizer is (I) an alkanolamine selected from the group consisting of

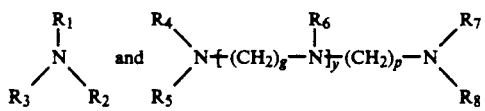

wherein $R_1$, $R_2$, $R_3$, $R_4$, $R_5$, $R_6$, $R_7$, and $R_8$ are the same or different from one another; $R_1$ and $R_2$ are selected from the group consisting of hydrogen and alkylenehydroxy radicals of the type $-(CH_2)_n-OH$ and $+(CH_2-)_n-O+_x(CH_2)_m-OH$; $R_3$, $R_4$, $R_5$, $R_6$, $R_7$, and $R_8$ are selected from the group consisting of alkylenehydroxy radicals of the type $-(CH_2)_m-OH$ and alkylene hydroxy radicals of the type $+(CH_2)_n-O+_x(CH_2-)_m-OH$, wherein m and n are integers from 1 to 6, p and g are integers from 1 to 10, x is an integer from 1 to 2, and y is an integer from 0 to 7; or (2) a salt of an alkanolamine as defined in (1) and an acid selected from the group consisting of boric acid, phosphoric acid and benzoic acid.

4. The process of claim 3 wherein the molar ratio of alkanolamine or alkanolamine salt to antimony present in the antimony component, either as antimony metal or as antimony trioxide, is from about 0.05:1 to about 2:1 and the concentration of antimony pentoxide, expressed as elemental antimony, in the dispersion is from about 10% to about 40% of the total weight of the dispersion.

5. The process of claim 4 wherein the antimony component is antimony trioxide.

6. The process of claim 5 wherein the stabilizer is an alkanolamine selected from the group consisting of diethanolamine and triethanolamine and the molar ration of is from about 0.05:1 to 0.1:1.

7. The process of claim 5 wherein the stabilizer is an alkanolamine salt selected from the group consisting of diethanolamine phosphate and triethanolamine phosphate and the molar ratio is from about 0.05:1 to about 0.1:1.

8. The process of claim 2 wherein the stabilizer is an aliphatic alpha-hydroxy carboxylic acid having 2 to 6 carbon atoms.

9. The process of claim 8 wherein the molar ratio of aliphatic alpha-hydroxy carboxylic acid to antimony present in the antimony component, either as antimony metal or as antimony trioxide, is from about 0.05:1 to about 2:1 and the concentration of antimony pentoxide, expressed as elemental antimony, in the dispersion is from about 10% to about 40% of the total weight of the dispersion.

10. The process of claim 9 wherein the antimony component is antimony trioxide.

11. The process of claim 10 wherein the alpha-hydroxy carboxylic acid is selected from the group consisting of tartaric acid, gluconic acid, malic acid, citric acid, hydroxyacetic acid, lactic acid, and glyceric acid, and the molar ratio is about 0.05:1.

12. The process of claim 2 wherein the stabilizer is an aliphatic polyhydroxy alcohol having vicinal hydroxyl groups and 2 to 6 carbon atoms.

13. The process of claim 12 wherein the molar ratio of polyhydroxy alcohol to antimony present in the antimony component, either as antimony metal or as antimony trioxide, is from about 0.05:1 to about 2:1 and the concentration of antimony pentoxide, expressed as elemental antimony, in the dispersion is from about 10% to about 40% of the total weight of the dispersion.

14. The process of claim 13 wherein the antimony component is antimony trioxide.

15. The process of claim 14 wherein the polyhydroxy alcohol is selected from the group consisting of glycerol, ethylene glycol, 1,2-propanediol, 1,2butanediol, 2,4-butanediol, and trimethylol propane.

16. A process for making a colloidal dispersion of hydrous antimony pentoxide particles comprising introducing a particulate antimony component selected from the group consisting of antimony metal and antimony trioxide into a dispersion medium which is essentially aqueous, said dispersion medium containing a stabilizing amount of a stabilizer selected from the group consisting of (1) an alkanolamine selected from the group consisting of

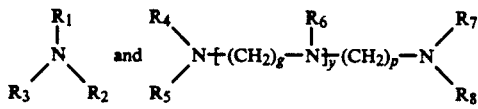

wherein $R_1$, $R_2$, $R_3$, $R_4$, $R_5$, $R_6$, $R_7$, and $R_8$ are the same or different from one another; $R_1$ and $R_2$ are selected from the group consisting of hydrogen and alkylenehydroxy radicals of the types $-(CH_2)_n-OH$ and $+(CH_2)_n-O+_x(CH_2)_m-OH$; $R_3$, $R_4$, $R_5$, $R_6$, $R_7$, and $R_8$ are selected from the group consisting of alkylenehydroxy radicals of the types $-(CH_2)_n-OH$ and $+(CH_2)_n-O+_x-(CH_2)_m-OH$, wherein m and n are integers from 1 to 6, p and g are integers from 1 to 10, x is an integer from 1 to 2, and y is an integer from 0 to 7; and (2) a salt of an alkanolamine as defined in (1) and phosphoric acid, contacting said antimony component with hydrogen peroxide in said dispersion medium at temperature of from about 0 degrees centigrade to about the decomposition temperature of the reaction mixture for a length of time sufficient to convert at least a portion of the antimony component to colloidal particles of hydrous antimony pentoxide.

17. The process of claim 16 wherein the molar ratio of alkanolamine or alkanolamine salt to antimony present in the antimony component, either as antimony metal or as antimony trioxide, is from about 0.05:1 to about 2:1 and the concentration of antimony pentoxide, expressed as elemental antimony, in the dispersion is from about 10% to about 40% of the total weight of the dispersion.

18. The process of claim 17 wherein the antimony component is antimony trioxide.

19. The process of claim 18 wherein the stabilizer is an alkanolamine selected from the group consisting of diethanolamine and triethanolamine and the molar ratio is about 0.05:1.

20. The process of claim 18 wherein the stabilizer is alkanolamine salt selected from the group consisting of diethanolamine phosphate and triethanolamine phosphate and the molar ratio is about 0.05:1.

21. The process of claim 16 wherein said antimony component is antimony trioxide.

22. The process of claim 16 wherein said stabilizer is selected from the group consisting of (1) an alkanolamine represented by the formula

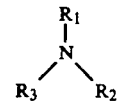

wherein $R_1$, $R_2$ and $R_3$ are the same or different from one another; $R_1$ and $R_2$ are selected from the group consisting of hydrogen and alkylene-hydroxy radicals of the types $-(CH_2)_n-OH$ and $+(CH_2)_n-O+_x(CH_2)_m-OH$; $R_3$ is selected from the group consisting of alkylenehydroxy radicals of the types $-(CH_2)_n-OH$ and $+(CH_2)_n-O+_x(CH_2)_m-OH$, wherein m and n are integers from 1 to 6 and x is an integer from 1 to 2; and (2) a salt of an alkanolamine as defined in (1) and phosphoric acid.

23. The process of claim 22 wherein said antimony component is antimony trioxide.

24. The process of claim 16 wherein said stabilizer is diethanolamine or triethanolamine.

25. The process of claim 24 wherein said antimony component is antimony trioxide.

26. The process of claim 16 wherein said stabilizer is diethanolamine phosphate or triethanolamine phosphate.

27. The process of claim 26 wherein said antimony component is antimony trioxide.

28. A process for producing a stable aqueous antimony pentoxide sol comprising an amount of antimony pentoxide which when expressed as antimony metal, is from about 0.01% to about 40% by weight and the remainder water, said sol prepared by admixing antimony trioxide, hydrogen peroxide and water and refluxing the mixture, then cooling the mixture, thus forming the stable antimony pentoxide sol.

29. A process for producing a stable aqueous antimony pentoxide sol comprising an amount of antimony pentoxide which, when expressed as antimony metal, is from about 0.01% to about 40% by weight, an amine in the molar ratio of from about 0.01:1 to about 4:1, based on antimony, and the remainder water, said sol prepared by admixing trioxide, hydrogen peroxide and water and refluxing the mixture, then cooling the mixture, and to the mixture adding an amine in a molar ratio of from about 0.01:1 to about 4:1 based on antimony, said amine selected from the group consisting of diethanolamine and triethanolamine, said sol capable of remaining stable upon drying.

30. A dry powder comprising antimony pentoxide, an amine and the remainder water, said powder prepared by admixing antimony trioxide, hydrogen peroxide and water and refluxing said mixture, then cooling said mixture and adding to said mixture an amine in a molar ratio of from about 0.01:1 to about 4:1, based on antimony, said amine selected from the group consisting of diethanolamine and triethanolamine, and drying the mixture to form said powder.

31. A process for producing a dry powder comprising antimony pentoxide, an amine and the remainder water, which comprises admixing antimony trioxide, hydrogen peroxide and water and refluxing said mixture, then cooling said mixture and adding to said mixture an amine in a molar ratio of about 0.01:1 to about 4:1, based on antimony, said amine selected from the group consisting of diethanolamine and triethanolamine, and drying the mixture to form said powder.

32. A stable aqueous antimony pentoxide sol comprising an amount of antimony pentoxide which, when expressed as antimony metal, is from about 0.01% to about 40% by weight, an amine in a molar ratio of from 0.01:1 to about 4:1, based on antimony, and the remainder water, said sol prepared by admixing antimony tri-oxide, an amine and water and to said mixture, adding $H_2O_2$ with refluxing, then cooling the mixture, thus forming the stable sol said amine being diethanolamine.

33. A process for producing a stable aqueous antimony pentoxide sol comprising an amount of antimony pentoxide which, when expressed as antimony metal, is from about 0.01% to about 40% by weight, an amine in a molar ratio of from 0.01:1 to about 4:1, based on antimony, and the remainder water, said sol prepared by admixing antimony trioxide, an amine and water and to said mixture, adding hydrogen peroxide with refluxing, then cooling the mixture, thus forming the stable sol, said amine being diethanolamine.

34. A dry powder comprising antimony pentoxide, an amine and the remainder water, said powder prepared by admixing antimony trioxide, an amine and water and to said mixture, adding hydrogen peroxide slowly with refluxing, cooling said mixture to form a sol comprising an amount of antimony pentoxide which, when expressed as antimony metal, is from about 0.01% to about 40% by weight, from about 0.01 to about 4 moles of an amine per mole of antimony metal present as the pentoxide and the remainder water, and then drying said sol to produce said powder, said amine being diethanolamine.

35. Process for producing a dry powder comprising antimony pentoxide, an amine and the remainder water which comprises admixing antimony trioxide, an amine and water to said mixture, adding hydrogen peroxide slowly with refluxing, and cooling said mixture to form a sol comprising an amount of antimony pentoxide which, when expressed as antimony metal, is from about 0.01% to about 40% by weight, from about 0.01 to about 4 moles of an amine per mole of antimony metal present as the pentoxide and the remainder water, and then drying said sol to produce said powder, said amine being diethanolamine.

* * * * *